US010668684B1

(12) United States Patent
Hilarides (10) Patent No.: US 10,668,684 B1
(45) Date of Patent: Jun. 2, 2020

(54) HYDRAULIC JACK FOR HAND TOOL REPAIR

(71) Applicant: Timothy A. Hilarides, Barstow, CA (US)

(72) Inventor: Timothy A. Hilarides, Barstow, CA (US)

( * ) Notice: Subject to any disclaimer, the term of this patent is extended or adjusted under 35 U.S.C. 154(b) by 251 days.

(21) Appl. No.: 15/871,511

(22) Filed: Jan. 15, 2018

Related U.S. Application Data

(60) Provisional application No. 62/445,769, filed on Jan. 13, 2017.

(51) Int. Cl.
| | | |
|---|---|---|
| *B23P 19/04* | (2006.01) | |
| *F16P 1/02* | (2006.01) | |
| *B23P 21/00* | (2006.01) | |
| *B30B 1/32* | (2006.01) | |
| *B30B 9/00* | (2006.01) | |
| *B30B 15/06* | (2006.01) | |

(52) U.S. Cl.
CPC ............... *B30B 1/32* (2013.01); *B23P 19/04* (2013.01); *B23P 21/00* (2013.01); *B30B 9/00* (2013.01); *F16P 1/02* (2013.01); *B30B 15/065* (2013.01)

(58) Field of Classification Search
CPC ......... B30B 1/32; B30B 15/08; B30B 15/065; F16P 1/02; B23P 19/04; B23P 19/10; B23P 19/12; B23P 21/00; Y10T 29/5397; Y10T 29/53978; Y10T 29/53826
USPC .......... 29/281.3, 281.25; 100/269.01, 269.17
See application file for complete search history.

(56) References Cited

U.S. PATENT DOCUMENTS

| | | | | |
|---|---|---|---|---|
| 4,169,412 A | * | 10/1979 | Stelmasik | ........... B30B 15/0029 100/257 |
| 4,620,352 A | * | 11/1986 | Sulej | ......................... B30B 1/32 100/257 |
| 5,524,336 A | * | 6/1996 | Gibas | .................... B65B 17/025 29/774 |
| 5,983,475 A | * | 11/1999 | Umling | ............... B25B 27/0035 29/281.5 |
| 2011/0219595 A1 | * | 9/2011 | Dalrymple | .............. B23P 19/04 29/426.5 |
| 2017/0015455 A1 | * | 1/2017 | Baskin | .................... B65B 57/04 |

* cited by examiner

*Primary Examiner* — Jimmy T Nguyen
(74) *Attorney, Agent, or Firm* — Cramer Patent & Design, PLLC; Aaron R. Cramer (57) ABSTRACT

A hydraulic powered press for hand tool repair is mounted to a wall and powered by an electric motor. A plurality of adjustable holders is secured about the side frame of the jack.

21 Claims, 5 Drawing Sheets

HYDRAULIC JACK FOR HAND TOOL REPAIR

RELATED APPLICATIONS

The present invention was first described in and claims the benefit of U.S. Provisional Patent Application No. 62/445,769 filed on Jan. 13, 2017, the entire disclosures of which are incorporated herein by reference.

FIELD OF THE INVENTION

The present invention relates generally to a hydraulic powered press for hand tool repair.

BACKGROUND OF THE INVENTION

As anyone who performs a lot of physical work will attest, nothing beats having the proper tool for a job. The proper tool can save time, save money, produce a higher quality job, reduce damage to equipment, and provide for the increased safety of the worker. Many of these tools are simple, time-proven tools, such as picks, axes, sledge hammers, and the like that have been around for generations. These tools typically have large wooden handles that unfortunately are subject to frequent damage and breakage due to the striking action undertaken during use of the tool. While such handles can be replaced, it is a time consuming and difficult operation due to the extreme force necessary to remove the old handle and insert a new handle. In fact, many users are known to simply discard the tool due to such problems thus leading to a higher cost of ownership as well increased landfill utilization and loss of natural resources.

Accordingly, there exists a need for a means by which handles on hand tools can be easily replaced without the disadvantages or described above. The development of the hydraulic apparatus for the repair of hand tools fulfills this need.

SUMMARY OF THE INVENTION

In view of the foregoing disadvantages inherent in the prior art, it has been observed that there is need of a hydraulic mechanism that is capable not only of removing a broken handle of large hand-held tool, such as a pickax, mattock, or sledgehammer, but also capable of installing a new handle on such a hand-held tool.

To achieve the above and other objectives, the present invention provides for a repair apparatus to include a tool holding frame assembly configured to be mounted to a vertical support surface, and a hydraulic pump assembly capable of being mounted to a support surface adjacent to the tool holding frame assembly and in fluid communication therewith.

The tool holding frame assembly minimally includes a frame having an upper backing plate section and a lower backing plate section, the hydraulic mechanism affixed to an upper section of the upper backing plate section, having a hydraulic cylinder and a ram movable relative to said hydraulic cylinder, a handle removal area located at a lower section of the upper backing plate section located directly below the hydraulic mechanism, having a handle removal case aligned with the ram, and a handle insertion area located at the lower backing plate section directly below the handle removal area. The handle removal area is capable of receiving a tool head of a tool therein. The handle insertion area is capable of supporting and retaining a handle of the tool.

It is an object of the present invention to provide such a handle removal case having an upper wall, a first opening in the upper wall aligned with the ram, a bottom wall, a second opening aligned with the first opening and the handle insertion area, a pair of sidewalls, each extending forward from the upper backing plate section and terminating at a common edge to the upper and bottom wall, and a safety guard parallel with the upper backing plate section and attached to and extending between the upper and bottom wall. The ram is capable of travelling through the first and second opening.

It is a further object of the present invention to provide such a said handle insertion area having a lower stop extending forward from a bottom of the lower backing plate section and capable of supporting the handle, a safety cage having a first side hingedly attached to a first side of the lower backing plate section and having a second side removably secured to a second side of the lower backing pate section.

It is an object of the present invention to provide such a hydraulic mechanism to further include a control valve in fluid communication with the pump and wherein the hydraulic cylinder further includes an upper reservoir in fluid communication with the control valve, and a lower reservoir in fluid communication with the control valve. The control valve selectively operates transfer of said hydraulic fluid between the upper reservoir and the lower reservoir, such that the ram moves in a selected vertical direction. The ram is capable of removing the handle from the tool head and is capable of securing another handle into the tool head by driving onto a handle sleeve covering a new handle to drive it onto the tool head. In certain embodiments, a level gauge located on an exterior wall of the hydraulic fluid reservoir.

It is a further object of the present invention to provide an access panel attached to the upper backing plate section to conceal a location where the ram enters the hydraulic cylinder The hydraulic pump assembly minimally includes a hydraulic fluid reservoir capable of retaining an amount of hydraulic fluid therein, an electric motor mounted to the reservoir, and a pump in electrical communication with the electric motor and in fluid communication between the hydraulic fluid reservoir and the hydraulic mechanism.

It is yet another object of the present invention to provide a support bracket extending away from either side of the tool holding frame assembly. The support bracket includes a handle holder located thereon It is still another object of the present invention to provide a tool holder plate extending away from either side of the tool holding frame assembly, further having at least one (1) tool support located on a front face thereof, and capable of supporting a work implement thereon.

It is still yet another object of the present invention to provide a vise mounting bracket extending away from either side of the tool holding frame assembly. The vise mounting bracket has a vise mounted thereon

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY 10 hydraulic apparatus
15 hydraulic pump assembly
20 tool holding frame assembly
21 upper backing plate section
22 handle removal case
23 gusset plate
24 lower backing plate section
25 mounting flange
26 support bracket
30 power cable
35 hydraulic hose
40 electric motor
45 hydraulic oil reservoir
46 level gauge
47 fill port
50 hydraulic pump
60 handle removal area
61 safety guard
62 access panel
65 handle insertion area
70 hydraulic cylinder
75 hydraulic control valve
80 hydraulic line
85 electrical power switch
90 tool holding tray
91 tool support
92 hook
95 repair tool
96 handle holder
100 vise
105 vise mounting bracket
110 tool head
115 handle
120 opening
125 ram
130 up/down travel path "UD"
135 lower stop
136 angle bracket
140 clearance opening
150 handle sleeve
155 downward force "D"
160 safety cage
161 hinge
165 clasp
170 upper reservoir
175 lower reservoir
180 electrical power source

DETAILED DESCRIPTION OF THE PREFERRED EMBODIMENT

The best mode for carrying out the invention is presented in terms of its preferred embodiment, herein depicted within FIGS. 1 through 4. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope.

The terms "a" and "an" herein do not denote a limitation of quantity, but rather denote the presence of at least one (1) of the referenced items.

Figure 1:
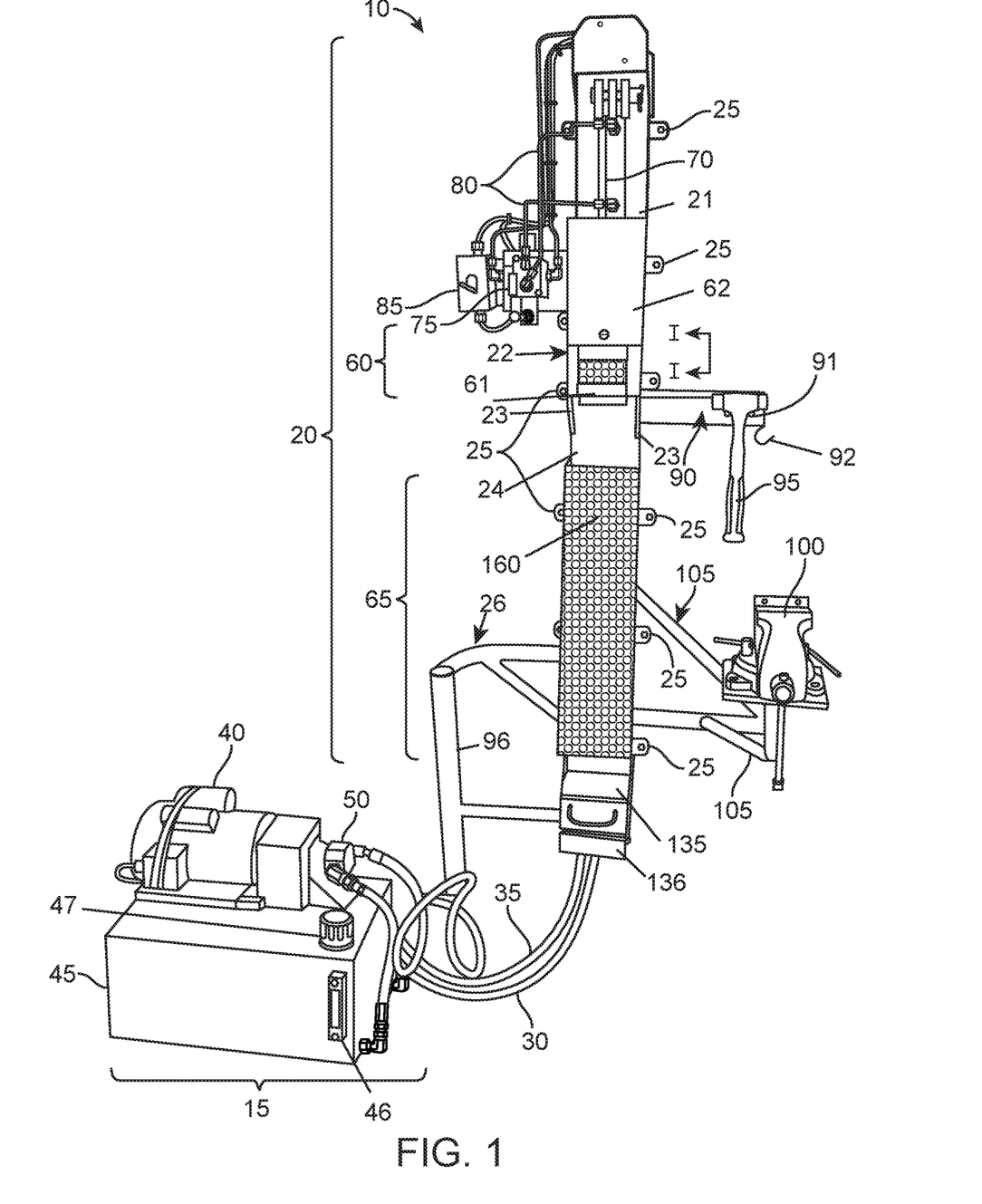
FIG. 1 is a front view of a hydraulic apparatus particularly suited for the repair of hand tools 10, according to the preferred embodiment of the present invention.

Referring now to FIG. 1, a front view of the hydraulic apparatus 10 for the repair of hand tools, according to the preferred embodiment of the present invention, is disclosed. The hydraulic apparatus 10 (herein described as the "apparatus") 10, is utilized to repair common large hand tools such as picks, axes, sledgehammers, and the like. The use of any particular type of hand tool is not intended to be a limiting factor of the present invention. The hand tools are envisioned to utilize a wooden handle 115 attached to a tool head 110 that is subject to periodic breakage and thus requires repair by replacement of the handle 115.

The apparatus 10 comprises two (2) main assemblies: a hydraulic pump assembly 15 and a tool holding frame assembly 20. The tool holding frame assembly includes a frame that has an upper backing plate section 21 and a lower backing plate section 22, each relatively planar. The tool holding frame assembly 20 is wall-mounted via a plurality of mounting flanges 25, each horizontally-aligned with each other and extending away from opposing sides of the upper backing plate section 21 and the lower backing plate section 24. The hydraulic pump assembly 15 is floor-mounted nearby and is connected to the tool holding frame assembly 20 via a plurality of power cables 30 and hydraulic hoses 35. The hydraulic pump assembly 15 includes an electric motor 40, a hydraulic oil reservoir 45, and a hydraulic pump 50, all of which are interconnected in a standard configuration that is well known in the art. A level gauge 46 is located on the exterior of the reservoir 45, typically on a side wall, and enables viewing of the amount of oil therein. A fill port 47 is also located on the reservoir 45, typically on the top, for providing fluid communication with the interior thereof, ostensibly to enable filling of oil therein. A cap is typically provided to seal the fill port 47. Additional detail on the hydraulic pump assembly 15 will be provided herein below.

The tool holding frame assembly 20 is provided with a handle removal area 60 and a handle insertion area 65. The handle removal area 60 and handle insertion area 65 along with their operation will be described in greater detail herein below. A hydraulic cylinder 70 is provided on the upper portion of the tool holding frame assembly 20 (mounted to the upper portion of the upper backing plate section 21) and arranged in a vertical orientation. A ram 125 is movable relative to the hydraulic cylinder 70. An access panel 62 provides access to the location where the ram 125 enters the hydraulic cylinder 70. The access panel 62 can be removably attached to mounts or hingedly attached to the upper backing plate section 21 and is preferably keyed to restrict unauthorized access. The hydraulic cylinder 70 is connected to a hydraulic control valve 75 via hydraulic lines 80. The hydraulic control valve 75 is envisioned to be of the closed center valve type, however such a type is not intended to be a limiting factor of the present invention. In turn, the hydraulic control valve 75 is connected to the hydraulic pump assembly 15 by another set of hydraulic lines 80. An electrical power switch 85 is provided to control electrical power to the electric motor 40 and thus overall ON/OFF application of the apparatus 10. Operation of the electrical power switch 85 thus activates travel of the ram 125 relative to the hydraulic cylinder 70.

A tool holding tray 90 is provided near the upper portion of the tool holding frame assembly 20 for the purposes of holding repair tools 95 such as hammers, saws, punches, files, or the like. The tool holding tray 90 includes a planar plate that is affixed to and extends away from either side of the tool holding frame assembly 20, preferably at or near the transition between the upper backing plate section 21 and the lower backing plate section 24. At least one (1) tool holder support 91 is mounted on the planar plate and is capable of holding tools. A hook 92 is located at the distal end of the planar plate away from the tool holding frame assembly 20 and is also capable of supporting a tool or other device thereon.

A vise 100 mounted upon a vise mounting bracket 105 is provided to assist the user in the overall repair of a large hand tool. The vise mounting bracket 105 is affixed to and extends away from either side of the tool holding frame assembly 20, preferably from the lower backing plate section 24 and subjacent from and on the same side as the tool holding tray 90. The vise 100 is disposed on the vise mounting bracket 105 opposite from the tool holding frame assembly 20. Envisioned uses of the vise 100 include holding a large hand tool while broken remnants of a handle 115 are sawn off or removed, holding a tool head 110 for filing, sharpening, sawing off excess handle 115, placement of wedges, painting, application of handle tape, or the like.

A support bracket 26 is provided near the lower portion of the tool holding frame assembly 20 for the purposes of providing support for a handle holder 96. The support bracket 26 includes a planar plate that is affixed to and extends away from either side of the tool holder frame assembly 20, preferably at a lower location from the lower backing plate section 24. The handle holder 26 is disposed on the opposite side of the support bracket 26 from the tool holding frame assembly 20. Preferably, the support bracket 26 and handle holder 96 reside on opposite sides of the tool frame assembly 20 than the tool holding tray 90, the vise mounting bracket 105, and the vise 100. The handle holder 96 is preferably a hollow tube, sized and configured to hold a conventionally-sized tool handle 115 such that a portion of the handle 115 is exposed so as to enable gripping thereof for insertion and removal. The handle holder 26 can be disposed in a vertical orientation or lightly offset from vertical to accomplish this.

It is envisioned that all frame components of the tool holding frame assembly 20 (i.e., the upper backing plate section 21, the lower backing plate section 24, the tool holding tray 90, the vise mounting bracket 105, and the support bracket 26) are made of heavy gauge steel that is welded together to withstand force of hundreds or thousands of pounds per square inch as would be anticipated during use of the hydraulic pump assembly 15 and hydraulic cylinder 70. The overall size of the apparatus 10 is approximately seven feet (7 ft.) tall, three feet (3 ft.) wide, and two feet (2 ft.) deep.

Figure 2A:
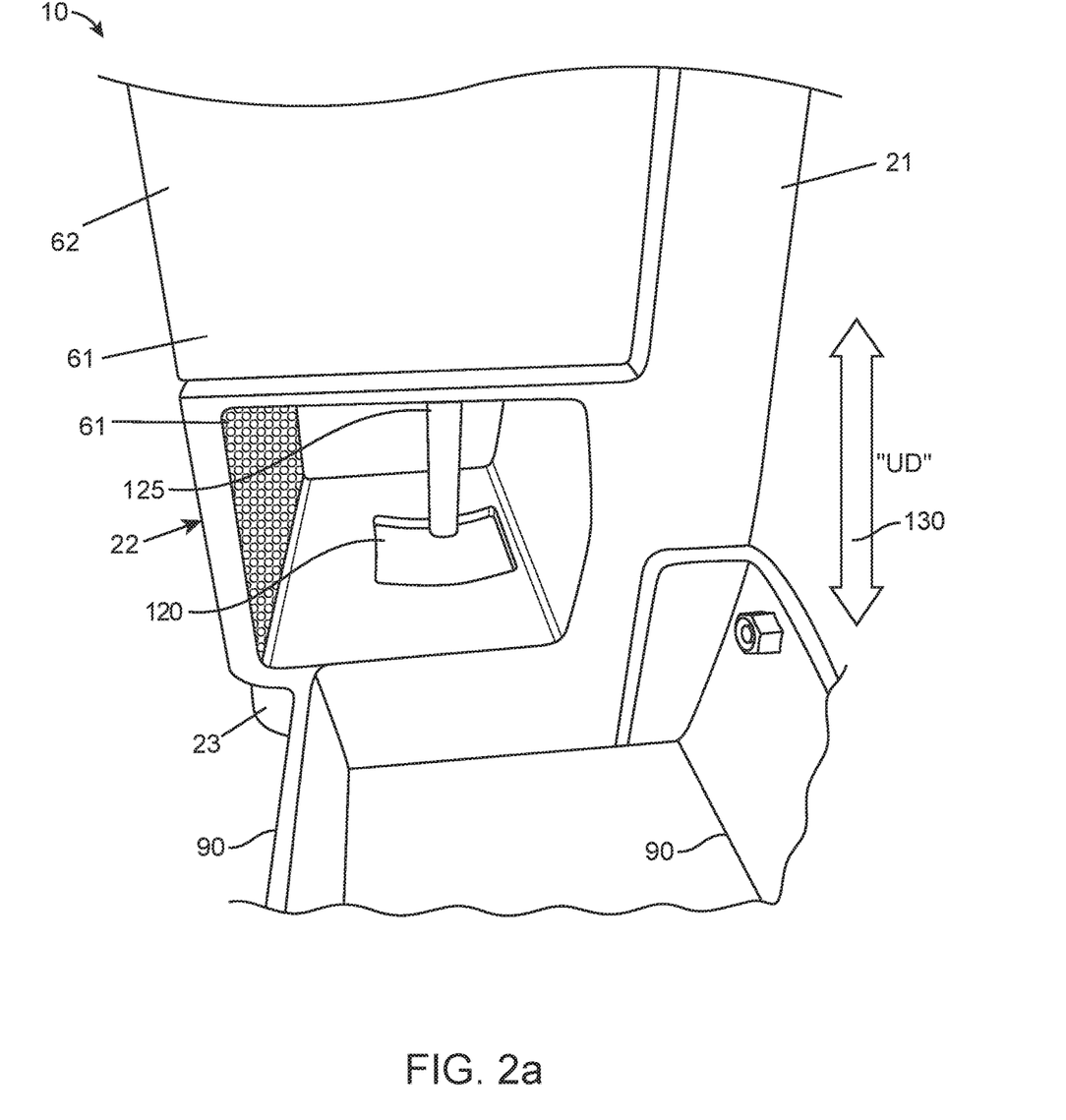
FIG. 2a is a detailed view of the handle removal area 60, as seen along a line I-I, as shown in FIG. 1, according to the preferred embodiment of the present invention.
Figure 2B:
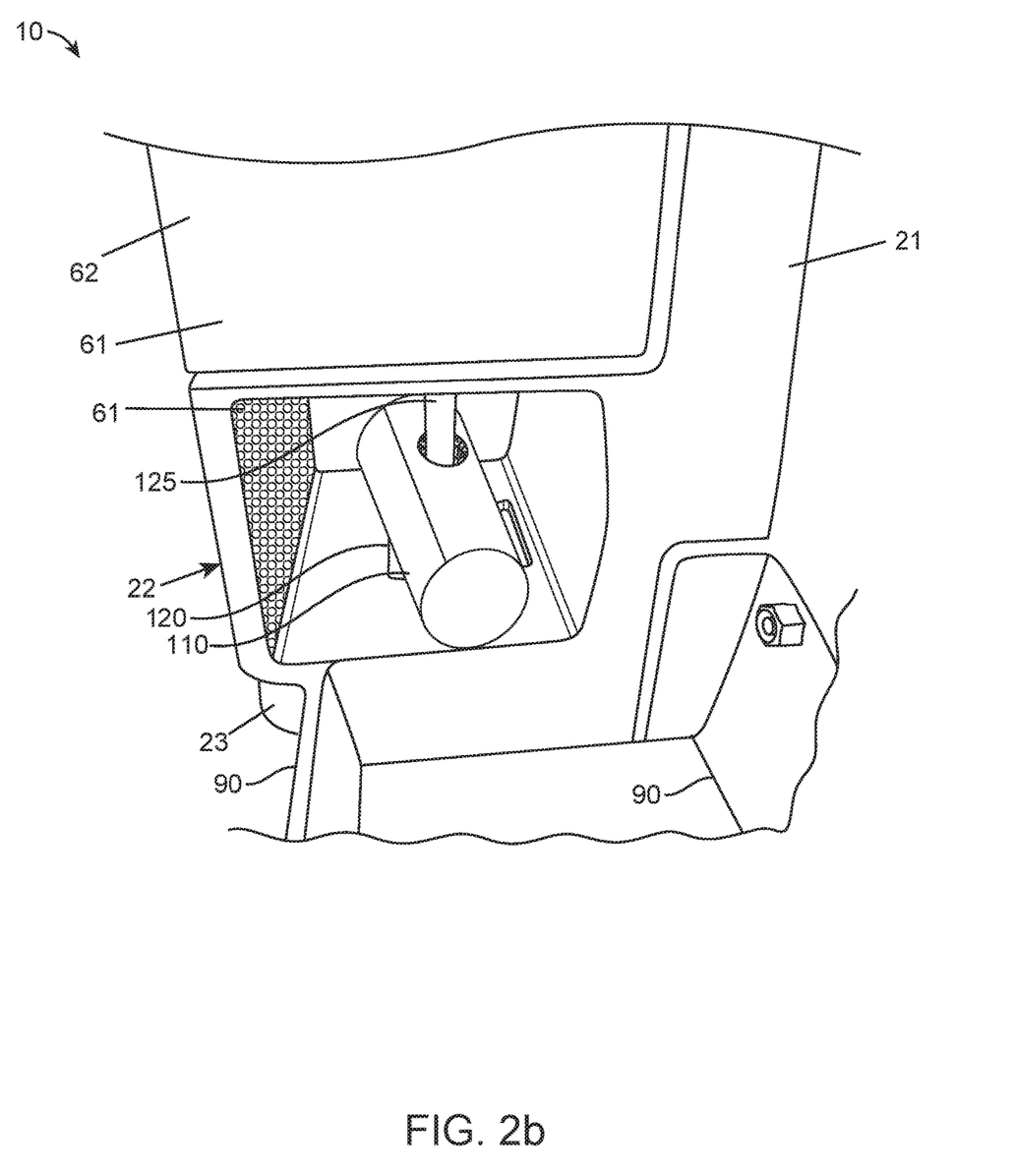
FIG. 2b is a detailed view of the handle removal area 60, showing a tool head 110 with broken handle 115 being removed, as seen along a line I-I, as shown in FIG. 1, according to the preferred embodiment of the present invention.

Referring next to FIG. 2a and FIG. 2b, detailed views of the handle removal area 60, as seen along a line I-I, as shown in FIG. 1, according to the preferred embodiment of the present invention. The tool holding tray 90 is presented in the foreground. The handle removal area 60 is located immediately subjacent from the hydraulic cylinder 60, such that the ram 125 is capable of travel therewithin. The handle removal area 60 is described as bounded by the lower portion of the upper backing plate section 21, the bottom of the access panel 62, and the handle removal case 22. The handle removal case 22 includes an upper perimeter wall where the access panel 62 rests thereon. The upper perimeter wall has a cut-out or opening (not shown) enabling passage of the ram 125. A pair of sidewalls each extend forward from the lower end of upper backing plate section 21 at a length enabling the ram 125 and a tool head 110 to reside therein. Between the upper perimeter wall and each of the pair of sidewalls is a window opening. A bottom wall parallel with the upper perimeter wall and extending between the pair of sidewalls has an opening 120 immediately below the ram 125 and upper perimeter cut-out or opening. The ram 125 thus can travel through the cut-out or opening in the upper perimeter wall and the opening 120. This opening 120 is sized to enable the handle 115 to pass through with plenty of clearance. The front of the handle removal case 22 is covered with a safety guard 61, preferably of a mesh or pierced plate to protect from ay debris from leaving the front of the handle removal case 22. It is envisioned that a pair of gusset plates 23 supports either side of the handle removal case 22, preferably the pair of sidewalls. The gusset plates 23 are attached to the pair of sidewall at a first end and an upper portion of the lower backing plate section 24 at the opposing second end.

A tool head 110, herein depicted as a sledge hammer head in phantom lines, with remnants of a broken handle 115, is positioned within the handle removal case 22 such that the broken handle 115 is positioned over the opening 120. The ram 125 proceeds to pierce the remnants of the broken handle 115 out and down through the opening 120 upon activation of the electrical power switch 85 and hydraulic control valve 75 (both of which are shown in FIG. 1). The ram 125 operates in an up/down travel path "UD" 130 as shown. Such operation continues until all pieces of the broken handle 115 are completely removed from the tool head 110.

Figure 3:
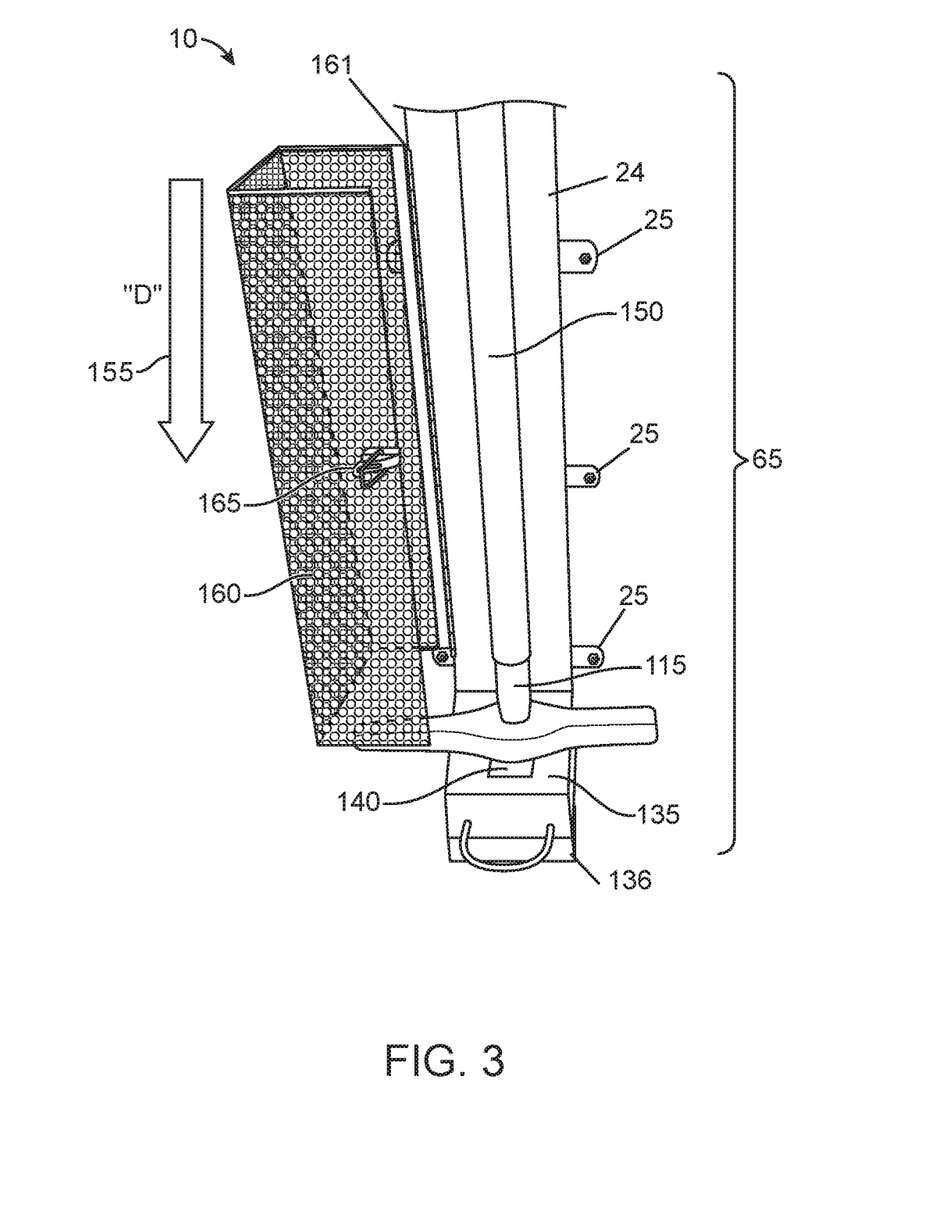
FIG. 3 is a detailed view of the handle insertion area 65, as provided by the hydraulic apparatus 10, according to the preferred embodiment of the present invention; and, FIG. 4 is a functional mechanical/electrical block diagram of the hydraulic apparatus 10, according to the preferred embodiment of the present invention.

Referring now to FIG. 3, a detailed view of the handle insertion area 65, as provided by the apparatus 10, according to the preferred embodiment of the present invention, is shown. In the figure, the tool head 110, herein depicted as a pick head, is placed upon a lower stop 135 with a clearance opening 140 for penetration of excess handle. Directly subjacent to the lower stop 135 is an angle bracket 136, which may provide additional support during operation of the hydraulic pump assembly 15. A new handle 115 is started by hand into the tool head 110. A handle sleeve 150 comprised of a capped metal pipe is then slid over the handle 115. Downward force "D" 155 is then applied to the upper end of the handle sleeve 150 via the ram 125 (as shown in FIG. 3) through the opening 120 (as shown in FIG. 3). Further description of the replacement operation will be provided herein below. A safety cage 160 covers the front and sides of the handle insertion area 65. A first side of the safety cage 160 is attached to one (1) side of the lower backing plate section 24 with a hinge 161, preferably along the entire side thereof. The opposing side of the safety cage 160 has at least one (1) clasp 165 for removable securement to the opposing side of the lower backing plate section 24. In the figure, the safety cage 160 is swung open, secured around the new handle 115, and the handle sleeve 150 and secured by a clasp 165 during replacement operation in case of breakage to contain dangerous flying components.

Figure 4:
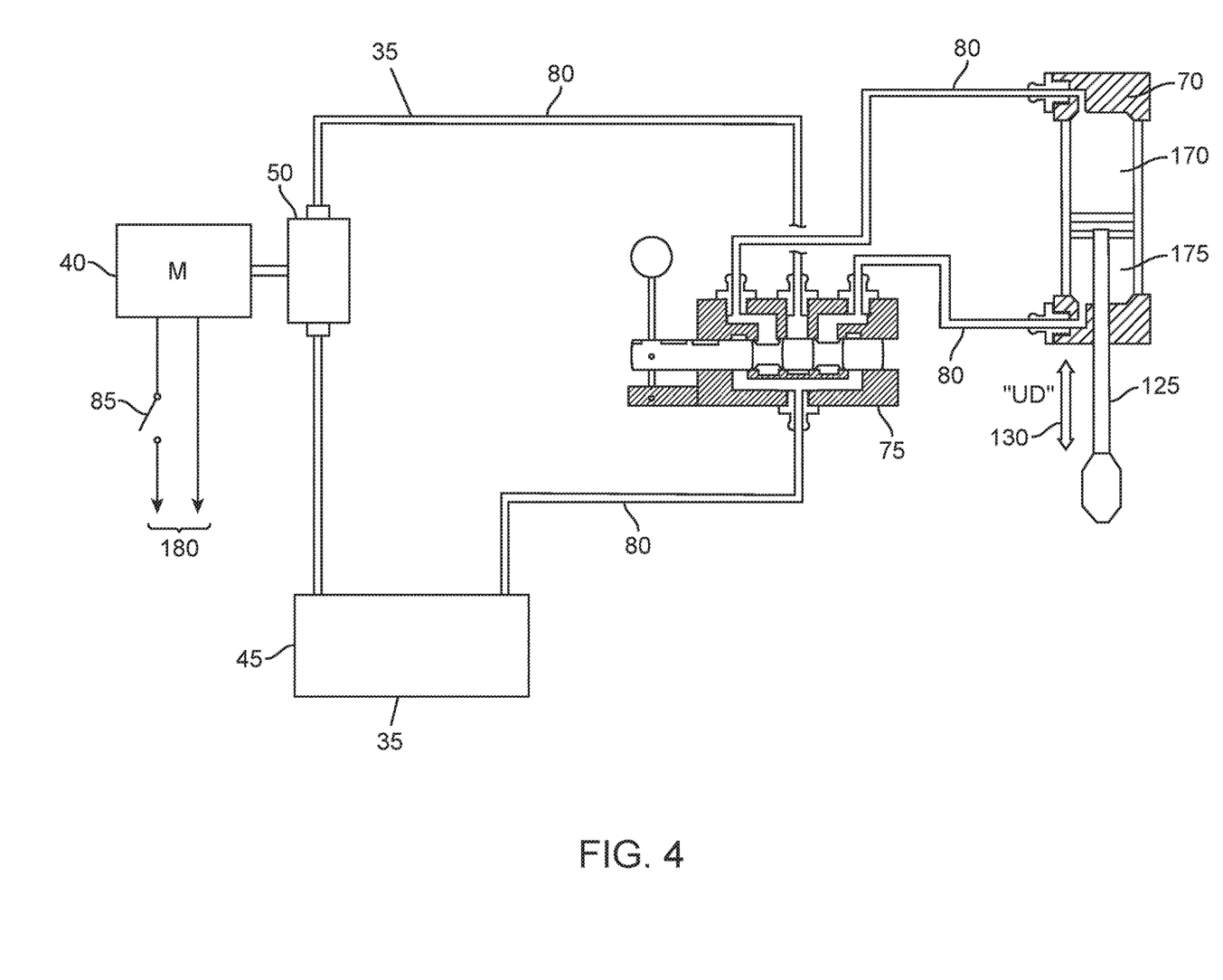

Referring finally to FIG. 4, a functional mechanical/electrical block diagram of the apparatus 10, according to the preferred embodiment of the present invention is disclosed. The hydraulic cylinder 70 is provided with an upper reservoir 170 and a lower reservoir 175 which are connected to the hydraulic control valve 75 via use of the hydraulic lines 80. As hydraulic fluid is transferred between the upper reservoir 170 and the lower reservoir 175, the ram 125 moves up and down as defined by the up/down travel path "UD" 130. Likewise, another set of hydraulic lines 80 connect the hydraulic control valve 75 to the hydraulic oil reservoir 45 and hydraulic pump 50 respectively. In a well-known process, the hydraulic pump 50 draws hydraulic fluid from the hydraulic oil reservoir 45 and delivers it to the hydraulic control valve 75 and thus the hydraulic cylinder 70, while returning hydraulic fluid from the hydraulic cylinder 70 and hydraulic control valve 75 is sent to the hydraulic oil reservoir 45 for re-use in a closed-loop process. The electric motor 40 converts electrical power to rotational energy for use by the hydraulic pump 50. The electric motor 40 receives electrical power as controlled by the electrical power switch 85 from an electrical power source 180, such an "AC" power outlet.

The preferred embodiment of the present invention can be utilized by the common user in a simple and effortless manner with little or no training. It is envisioned that the apparatus 10 would be constructed in general accordance with FIG. 1 through FIG. 4. After procurement of the apparatus 10, the tool holding frame assembly 20 would be attached to a local vertical surface such as a structural wall, the hydraulic pump assembly 15 would be set upon the floor nearby, and the power cables 30 and hydraulic hoses 35 would be interconnected between the two (2) components. The electrical power source 180 would be connected as shown in FIG. 4. At this point in time, the apparatus 10 would be ready to be utilized.

When a large hand tool such as an axe, pick, sledgehammer, or the like is presented with a broken handle 115, it would be repaired by replacing the handle utilizing the assistance of the apparatus 10. First, the balance of the broken handle 115 would be removed by placing the hand tool in the vise 100 and cutting the broken handle 115 off near the tool head 110 using various repair tools 95 such as a saw. Next, the tool head 110 is placed within the handle removal case 22 of the handle removal area 60 so that the broken handle 115 is positioned over the opening 120. The ram 125 proceeds to pierce the remnants of the broken handle 115 out and down through the opening 120 upon activation of the electrical power switch 85 and hydraulic control valve 75. The ram 125 operates in the up/down travel path "UD" 130 as shown. Such operation continues until all pieces of the broken handle 115 are completely removed from the tool head 110.

Next, a new handle 115 is started in the tool head 110 with a handle sleeve 150 over it, and then it is placed within the handle insertion area 65. Downward force "D" 155 is then applied to the upper end of the handle sleeve 150 via the ram 125 through the opening 120. The safety cage 160 is secured around the new handle 115 and the handle sleeve 150 by the clasp 165 during replacement operation in case of breakage.

After the new handle 115 is fully inserted, the hand tool is removed from the apparatus 10 for subsequent finishing repair, such as the cutoff of excess handle 115, insertion of wedges, and the like is completed. Such features not only saves time and money on replacement of hand tools, but by extending the useful life of said hand tools, broken tools will be kept out of space in landfills and save natural resources by allowing the extended use of the tool head 110 while simply repairing the wooden handle 115, a renewable resource.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

The invention claimed is:

1. A hand tool repair apparatus, comprising:
   a tool holding frame assembly, configured to be mounted to a vertical support surface, comprising:
   a frame, comprising an upper backing plate section and a lower backing plate section;
   a hydraulic mechanism affixed to an upper section of said upper backing plate section, including a hydraulic cylinder and a ram movable relative to said hydraulic cylinder;
   a handle removal area located at a lower section of said upper backing plate section located directly subjacent from said hydraulic mechanism, comprising a handle removal case aligned with said ram;
   a handle insertion area located at said lower backing plate section directly subjacent said handle removal area;
   a support bracket extending away from either side of said tool holding frame assembly, said support bracket having a handle holder located thereon; and,
   a hydraulic pump assembly, comprising:
   a hydraulic fluid reservoir, configured to be mounted to a ground surface adjacent said tool holding frame assembly, and capable of retaining an amount of hydraulic fluid therein;
   an electric motor mounted to said reservoir; and,
   a pump in electrical communication with said electric motor and in fluid communication between said hydraulic fluid reservoir and said hydraulic mechanism;
   wherein said handle removal area is configured to receive a tool head of a tool therein;
   wherein said handle insertion area is configured to support and retain a handle of said tool;
   wherein said hydraulic mechanism is configured to remove said handle from said tool head; and,
   wherein said hydraulic mechanism is configured to secure another handle into said tool head.

2. The apparatus of claim 1, wherein said hydraulic mechanism further comprises:

a control valve in fluid communication with said pump; and, said hydraulic cylinder further comprises:

an upper reservoir in fluid communication with said control valve; and, a lower reservoir in fluid communication with said control valve;

wherein when said control valve selectively operates transfer of said hydraulic fluid between said upper reservoir and said lower reservoir, said ram moves in a selected vertical direction.

3. The apparatus of claim 2, wherein said hydraulic mechanism further comprises an access panel attached to said upper backing plate section to conceal a location where said ram enters said hydraulic cylinder.

4. The apparatus of claim 2, wherein said handle removal case further comprises:

an upper wall, having an opening aligned with said ram;

a bottom wall, having a clearance opening aligned with said opening and said handle insertion area;

a pair of sidewalls, each extending forward from said upper backing plate section, terminating at a common edge to said upper wall and said bottom wall; and, a safety guard parallel with said upper backing plate section and attached to and extending between said upper wall and said bottom wall;

wherein said ram is capable of travelling through said opening and said clearance opening.

5. The apparatus of claim 2, wherein said handle insertion area further comprises:

a lower stop, extending forward from a bottom of said lower backing plate section, capable of supporting said handle thereon; and, a safety cage, having a first side hingedly attached to a first side of said lower backing plate section and having a second side removably secured to a second side of said lower backing pate section.

6. The apparatus of claim 2, wherein said hydraulic fluid reservoir further comprises a level gauge located on an exterior wall thereof.

7. The apparatus of claim 2, further comprising a plurality of mounting flanges extending away from said upper backing plate section and said lower backing plate section.

8. A hand tool repair apparatus, comprising:

a tool holding frame assembly, configured to be mounted to a vertical support surface, comprising:

a frame, comprising an upper backing plate section and a lower backing plate section;

a hydraulic mechanism affixed to an upper section of said upper backing plate section, including a hydraulic cylinder and a ram movable relative to said hydraulic cylinder;

a handle removal area located at a lower section of said upper backing plate section located directly subjacent from said hydraulic mechanism, comprising a handle removal case aligned with said ram;

a handle insertion area located at said lower backing plate section directly subjacent said handle removal area;

a support bracket extending away from either side of said tool holding frame assembly, said support bracket having a handle holder located thereon;

a tool holder plate extending away from either side of said tool holding frame assembly, further having at least one tool support located on a front face thereof, capable of supporting a work implement thereon; and, a hydraulic pump assembly, comprising:

a hydraulic fluid reservoir, configured to be mounted to a ground surface adjacent said tool holding frame assembly, and capable of retaining an amount of hydraulic fluid therein;

an electric motor mounted to said reservoir; and, a pump in electrical communication with said electric motor and in fluid communication between said hydraulic fluid reservoir and said hydraulic mechanism;

wherein said handle removal area is configured to receive a tool head of a tool therein;

wherein said handle insertion area is configured to support and retain a handle of said tool;

wherein said hydraulic mechanism is configured to remove said handle from said tool head; and, wherein said hydraulic mechanism is configured to secure another handle into said tool head.

9. The apparatus of claim 8, wherein said hydraulic mechanism further comprises:

a control valve in fluid communication with said pump; and, said hydraulic cylinder further comprises:

an upper reservoir in fluid communication with said control valve; and, a lower reservoir in fluid communication with said control valve;

wherein when said control valve selectively operates transfer of said hydraulic fluid between said upper reservoir and said lower reservoir, said ram moves in a selected vertical direction.

10. The apparatus of claim 9, wherein said hydraulic mechanism further comprises an access panel attached to said upper backing plate section to conceal a location where said ram enters said hydraulic cylinder.

11. The apparatus of claim 9, wherein said handle removal case further comprises:

an upper wall, having an opening aligned with said ram;

a bottom wall, having a clearance opening aligned with said opening and said handle insertion area;

a pair of sidewalls, each extending forward from said upper backing plate section, terminating at a common edge to said upper wall and said bottom wall; and, a safety guard parallel with said upper backing plate section and attached to and extending between said upper wall and said bottom wall;

wherein said ram is capable of travelling through said opening and said clearance opening.

12. The apparatus of claim 9, wherein said handle insertion area further comprises:

a lower stop, extending forward from a bottom of said lower backing plate section, capable of supporting said handle thereon; and, a safety cage, having a first side hingedly attached to a first side of said lower backing plate section and having a second side removably secured to a second side of said lower backing pate section.

13. The apparatus of claim 9, wherein said hydraulic fluid reservoir further comprises a level gauge located on an exterior wall thereof.

14. The apparatus of claim 9, further comprising a plurality of mounting flanges extending away from said upper backing plate section and said lower backing plate section.

15. A hand tool repair apparatus, comprising:

a tool holding frame assembly, configured to be mounted to a vertical support surface, comprising:

a frame, comprising an upper backing plate section and a lower backing plate section;

a hydraulic mechanism affixed to an upper section of said upper backing plate section, including a hydraulic cylinder and a ram movable relative to said hydraulic cylinder;

a handle removal area located at a lower section of said upper backing plate section located directly subjacent from said hydraulic mechanism, comprising a handle removal case aligned with said ram;

a handle insertion area located at said lower backing plate section directly subjacent said handle removal area;

a support bracket extending away from either side of said tool holding frame assembly, said support bracket having a handle holder located thereon;

a tool holder plate extending away from either side of said tool holding frame assembly, further having at least one tool support located on a front face thereof, capable of supporting a work implement thereon;

a vise mounting bracket extending away from either side of said tool holding frame assembly, said vise mounting bracket having a vise mounted thereon; and, a hydraulic pump assembly, comprising:

a hydraulic fluid reservoir, configured to be mounted to a ground surface adjacent said tool holding frame assembly, and capable of retaining an amount of hydraulic fluid therein;

an electric motor mounted to said reservoir; and, a pump in electrical communication with said electric motor and in fluid communication between said hydraulic fluid reservoir and said hydraulic mechanism;

wherein said handle removal area is configured to receive a tool head of a tool therein;

wherein said handle insertion area is configured to support and retain a handle of said tool;

wherein said hydraulic mechanism is configured to remove said handle from said tool head; and, wherein said hydraulic mechanism is configured to secure another handle into said tool head.

16. The apparatus of claim 15, wherein said hydraulic mechanism further comprises:

a control valve in fluid communication with said pump; and, said hydraulic cylinder further comprises:

an upper reservoir in fluid communication with said control valve; and, a lower reservoir in fluid communication with said control valve;

wherein when said control valve selectively operates transfer of said hydraulic fluid between said upper reservoir and said lower reservoir, said ram moves in a selected vertical direction.

17. The apparatus of claim 16, wherein said hydraulic mechanism further comprises an access panel attached to said upper backing plate section to conceal a location where said ram enters said hydraulic cylinder.

18. The apparatus of claim 16, wherein said handle removal case further comprises:

an upper wall, having an opening aligned with said ram;

a bottom wall, having a clearance opening aligned with said opening and said handle insertion area;

a pair of sidewalls, each extending forward from said upper backing plate section, terminating at a common edge to said upper wall and said bottom wall; and, a safety guard parallel with said upper backing plate section and attached to and extending between said upper wall and said bottom wall;

wherein said ram is capable of travelling through said opening and said clearance opening.

19. The apparatus of claim 16, wherein said handle insertion area further comprises:

a lower stop, extending forward from a bottom of said lower backing plate section, capable of supporting said handle thereon; and, a safety cage, having a first side hingedly attached to a first side of said lower backing plate section and having a second side removably secured to a second side of said lower backing pate section.

20. The apparatus of claim 16, wherein said hydraulic fluid reservoir further comprises a level gauge located on an exterior wall thereof.

21. The apparatus of claim 16, further comprising a plurality of mounting flanges extending away from said upper backing plate section and said lower backing plate section.

* * * * *